(12) United States Patent
Herberger et al.

(10) Patent No.: US 7,391,445 B2
(45) Date of Patent: Jun. 24, 2008

(54) SYSTEM AND METHOD OF CREATING MULTILAYERED DIGITAL IMAGES IN REAL TIME

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 874 days.

(21) Appl. No.: 10/813,830

(22) Filed: Mar. 31, 2004

(65) Prior Publication Data

US 2005/0219384 A1 Oct. 6, 2005

(51) Int. Cl.
*H04N 5/262* (2006.01)
*H04N 5/228* (2006.01)
*G06K 9/36* (2006.01)

(52) U.S. Cl. ............... 348/239; 348/22.1; 382/284
(58) Field of Classification Search ........... 348/239, 348/222.1, 231.6, 207.99, 207.1, 231.99, 348/231.3, 333.01, 333.02, 333.03, 333.05, 348/333.11, 333.12, 584; 382/284; 358/540
See application file for complete search history.

(56) References Cited

U.S. PATENT DOCUMENTS

| | | | |
|---|---|---|---|
| 4,011,571 A * | 3/1977 | Okuzawa | .............. 396/291 |
| 5,093,798 A | 3/1992 | Kita | |
| 5,459,819 A | 10/1995 | Watkins et al. | |
| 5,633,678 A | 5/1997 | Parulski et al. | |
| 5,914,748 A | 6/1999 | Parulski et al. | |
| 6,034,698 A | 3/2000 | Yasuda | |
| 6,151,009 A | 11/2000 | Kanade et al. | |
| 6,166,744 A | 12/2000 | Jaszlics et al. | |
| 6,229,550 B1 | 5/2001 | Gloudemans et al. | |
| 6,304,291 B1 | 10/2001 | Silverbrook | |
| 6,310,647 B1 * | 10/2001 | Parulski et al. | .......... 348/231.99 |
| 6,366,316 B1 | 4/2002 | Parulski et al. | |
| 6,462,778 B1 | 10/2002 | Abram | |
| 6,546,187 B1 | 4/2003 | Miyazaki et al. | |
| 6,621,524 B1 * | 9/2003 | Iijima et al. | .............. 348/584 |
| 2002/0105589 A1 | 8/2002 | Brandenberger et al. | |
| 2002/0118209 A1 | 8/2002 | Hylen | |
| 2002/0171746 A1 | 11/2002 | Stephany et al. | |
| 2003/0025808 A1 * | 2/2003 | Parulski et al. | .......... 348/231.99 |

* cited by examiner

*Primary Examiner*—Lin Ye
*Assistant Examiner*—Yogesh Aggarwal
(74) *Attorney, Agent, or Firm*—Fellers, Snider, Blankenship, Bailey & Tippens, P.C.; Terry L. Watt

(57) ABSTRACT

There is provided herein a system and method for enabling a digital photo device to create pictures that contain live images that have been combined with predefined templates in real time, wherein the user selects graphical or effect templates which have been provided by the software developer. Preferably the combination of the templates and subject image will be displayed in real-time so that the user will know exactly how the final product will appear before the image is captured. Preferably, a preview screen will be used to display the combined templates/subject image in real time and the final digital image is similarly captured, calculated, and stored in real time.

17 Claims, 4 Drawing Sheets

SYSTEM AND METHOD OF CREATING MULTILAYERED DIGITAL IMAGES IN REAL TIME

FIELD OF THE INVENTION

The present invention relates generally to the field of digital photography and digital imaging. More particularly, but not by way of limitation, the present invention relates to a process which provides for the real-time creation of digital images containing multi-layer content on digital imaging devices such as digital cameras.

BACKGROUND OF THE INVENTION

Since its introduction in the 19th century, the field of photography has seen near continuous improvements in the associated technology. The introduction of the roll film in 1888, the introduction of the colour negative film in 1942, and the development of the Advanced Photo System in 1990 are all examples of the sorts of technological leaps forward that are characteristic of this industry. The introduction of digital photo cameras near the end of the 20th and the beginning of the 21st century marked another substantial step in the evolution of photography, the step into the digital domain. Of course, in the time since its introduction, digital photography has made its way into cell phones, PDAs, etc., all of which has contributed even further to the growing acceptance of the digital photography worldwide.

One factor that has contributed to the widespread adoption of digital photography has been the steady improvement in editing software for use with digital photographs. This sort of software can turn a user's personal computer into a digital editing station and has made it easy to perform basic editing on and save such images.

The quality of digital photographs has progressed to the point where it is suitable for use in commercial settings where high quality is important (e.g., promotional photographs of buildings, objects, etc.) as well as non-commercial settings in connection with momentous occasions, vacations etc. Photography has always provided a motivation for people to shoot pictures of new areas, to explore the world and to chapter the world with photographs that can be shared with friends and relatives. An offshoot of this drive to innovate has been a desire in many users to create "fun" pictures. Although these pictures might take many forms, one popular sort of recreational picture involves using a photo prop to create a humorous or improbable scene, wherein the photo prop takes the form of a painted wood panel with a cartoon-like scene printed on the face thereof. The user then is positioned behind the prop and extends one or more body parts (e.g., his or her head, arms, legs, etc.) through apertures that have been provided in the prop for that purpose. The prop when photographed from the front then captures the image of a recognizable subject in the context of the cartoon illustration of the prop (e.g., the user might appear to be a lion tamer who is beset by lions, etc.).

Today it is possible to create digital images that mimic the use of physical photo props through the use of software that has been specifically developed for that purpose. More specifically, there are a number of software applications that allow the user to combine digital pictures with custom templates to produce novelty images which previously had to be composed physically or created by custom photo processing.

However, such computer applications are not without their problems. First, the user must select one of his or her own digital images from which the subject will be extracted. That image, though, will have been taken for another purpose and will likely be at an illumination level, or scale (e.g., at a different number of pixels per inch) that is incompatible with the intended template, or the size of the subject or photographic angle will not match that of the template's requirements. Of course, some of the foregoing problems may be corrected digitally, but that might require a level of sophistication beyond that of the average user. Additionally such computer-based applications require that the user be able to transfer the pictures from a digital photo device onto the computer, a task that may be beyond those users who traditionally give their magnetic cards over to a vendor to print or that use a direct camera-to-printer connection.

As can be seen from the previous description, the process of creating such a combined picture from an existing photograph potentially requires the execution of several complex steps. Further, the creation of such combined digital images is likely to be costly to the user both in terms of the software that is required and the time that must be invested in order to create a pleasing combined picture. Finally, the user will need to master the various hardware and software interface requirements of his or her personal computer so that pictures can be moved from the digital photo device onto the user's personal computer.

Those of ordinary skill in the art will recognize that increases in the speed and sophistication of the microprocessor resident within digital photo devices has created an opportunity for manufacturers to offer new function features and for independent software developers to produce software that further enhances the camera's abilities. Additionally, the computational power of digital photo devices has grown beyond the simple functionality offered previously by first generation photo cameras and now permits sophisticated programming and image manipulation to take place within the photo device.

Thus, what is needed is a cheaper and more efficient method of creating novelty photos. Preferably the method will be one that requires a lesser investment in hardware and software and that is easier to learn than conventional methods. Additionally it is preferred that the creation process provides for combining multiple layers into a single photograph and that the combined image—including that of the user—be available at least as a preview image in real-time while the image is being composed.

Heretofore, as is well known in the media editing industry, there has been a need for an invention to address and solve the above-described problems. More particularly, there has been a need of a system and method that allows a user to quickly and easily create novelty photographs without a substantial investment in computer software and hardware. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for creating composite multi-layered pictures within a digital photo device in real time, wherein the user selects a photographic template, after which the selected template will be displayed on the view screen of the photo device while the user composes a photograph of a subject. When the photograph is taken, the software within the photo device will combine the pre-selected template and the photographic image in real-time to produce a stored image of the subject with the selected template imposed thereon.

According to a preferred embodiment, the instant invention will begin by providing the user with a selection of templates that have been previously stored within the photo device. These templates might consist of graphical information (e.g., a digital image) or data (e.g., parameters of a digital transformation). The graphical templates might show famous people or locations, wherein a portion of each template has been left blank or transparent. These sorts of templates might be provided in an assortment of different sizes and colours. The templates that contain parameter values would be most useful where it was desired to apply a mathematical transformation to the digital image. For example, the stored parameter values might signal that an effect like a mirror-image line should be applied, where the equation of the imaginary line that defines the transformation would be stored as parameters in a template. As another example, a morphological transformation might be specified by storing parameter values in the template which define the portion of the digital image which is to be morphed to fit a predefined shape.

As a next preferred step, the invention will display the selected template to the user via any available display source of the photo device which might include, for example, its full resolution display screen, its preview screen, or its view finder, depending on the particular hardware configuration of the device. The template will preferably be automatically positioned with respect to the camera display at a location which is defined by the parameter settings of the template.

As a next preferred step the user will orient the digital photo device to align the subject which he wants to take a picture of with the selected template. For example, if the selected template has a transparent region that is intended to accommodate an individual's head, the user will point the camera at a human subject and adjust the zoom (or distance to the subject) so that the subject's head appears within the region provided. The user has complete control over the process of filling in the template with a digital image. That is, he or she can reposition the camera, adjust the zoom, ask the subject to reposition himself or herself, change the lighting, activate/deactivate the flash, etc., all the while referring to the camera display device wherein an image of the combined template and photographic subject is available in real time.

After the user has completed the alignment process he or she will be able to take the picture as is conventionally done. The stored digital image will preferably contain the template information combined with the subject information exactly as the combination previously appeared on the display device.

In another preferred embodiment, the instant invention allows the user to create a multi-layer template which will then be applied in composite to the photographic image. In brief, in this preferred embodiment the user will successively select a plurality of templates from among those provided. Preferably the user will also be able to select a combination of graphical and data templates if that is desired. However, in order to assist the user in combining multiple templates into a pleasing composite various selection rules will preferably be imposed.

By way of example only, the sorts of rules that might be utilized include imposing an upper limit on the percentage of the final image that such a multi-layer arrangement can obscure. As another example, a limit might be imposed on the number of graphical templates and data templates that are to be combined. In addition to these sorts of restrictions, the instant invention could also contain a list of incompatible templates, templates that, say, contain no transparent areas of the screen in common or that specify transformations of the digital image that are not productive (e.g., an inverted image that is applied twice will yield the original image). Further, a preferred embodiment of the instant invention might also feature a collision detection algorithm, which helps assure that two templates in a multi-layer arrangement do not obscure each other or completely block the subject image. That is, the collision detection algorithm preferably will check to determine whether the blank areas of the templates interfere with each other and, if they do, the software preferably will not permit the user to select the second template.

Thus, it should be clear to those of ordinary skill in the art that the methods described herein would be a tremendous addition to the capabilities of the digital photo devices which are equipped with the appropriate processing power. This methods taught herein would enable a user to create a wide variety of different photographic images of a subject by providing a selection of templates that can be overlaid on the digital image and displayed in real-time as the user composes the picture. This will enable the user to quickly and easily create memorable novelty pictures without having to cope with the requirements of his or her hardware or software. This process will enhance the value of digital photo devices beyond their primary function and enable even a novice user to create complex composite images in real time without the need of a separate personal computer.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
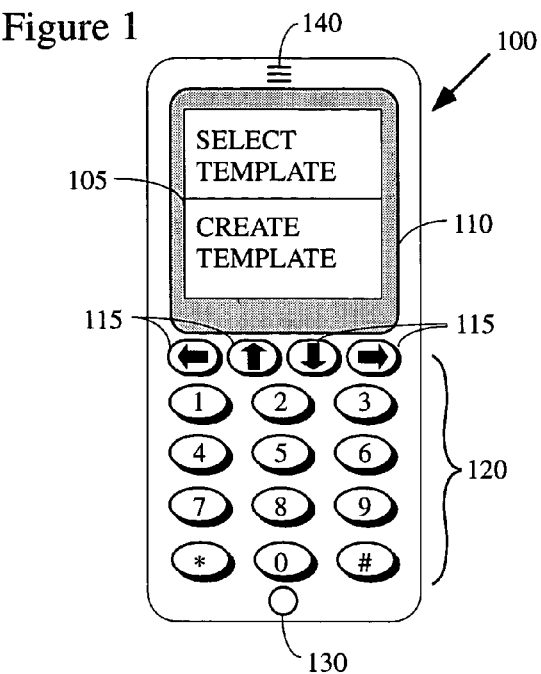
FIG. 1 depicts an embodiment of the instant invention executing on a photo-equipped cell phone with its menu options being displayed on the display screen/preview screen of the device.
Figure 2:
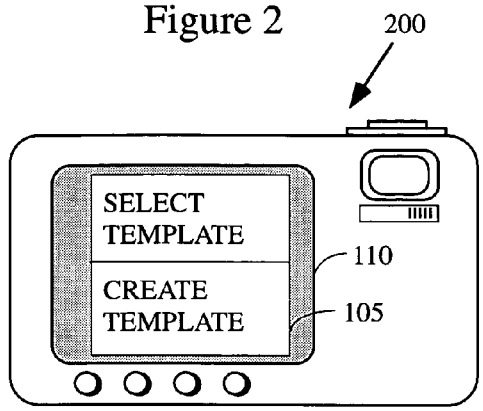
FIG. 2 depicts another device suitable for use with the instant invention.

Referring now to the drawings, wherein like reference numerals indicate the same parts throughout the several views, there is provided a preferred system and method for composing and acquiring in real-time a multi-layered image using a digital photo device. As is generally indicated in FIGS. 1 and 2, at least a portion of the instant invention will be implemented in the form of software running on a digital photo device (e.g., cellular phone 100 or digital camera 200) that is capable of executing such software. Such a digital photo device will have some amount of program memory and data storage capability as is conventionally supplied with such units. Note that, for purposes of specificity in the text that follows, the instant invention will be discussed from the standpoint of software that is executing within the microprocessor of a cellular phone. That being said, those of ordinary skill in the art will recognize that the instant invention is adaptable to, and suitable for use on, any device that contains a digital camera including, without limitation, dedicated digital cameras, handheld computers (e.g., Palm®-compatible devices and pocket PCs that utilize the Microsoft® operating system.), etc.

According to a preferred embodiment, a user of the instant system will interact with it by way of graphic display 110, function buttons 115, and a menu system 105, a portion of which menu system 105 is illustrated in FIG. 1. Additionally, the phone 100 will have a speaker 140 and a microphone 130 as is customary with such devices. Note that, in accord with the preferred embodiment, it is to be understood that the menu items that are displayed in the various figures attached hereto illustrate only a few of the options that will preferably be provided to the user and, as a consequence, the instant invention is not to be limited by the content of the displayed figures.

Preferably, the user will interact with the software of the instant invention by way of a menu system 105 of the sort generally depicted in FIG. 1. As a first preferred step the user will activate the menu system 105 and will thereafter be presented with at least two choices. A first preferred choice would allow the user to select a template from among those previously stored on the device 100. A second preferred choice would take the user to another screen where custom templates could be constructed according to methods discussed hereinafter. Of course, the menu 105 could contain additional options including, for example, a menu entry that would allow the user to activate any number of different utility functions (e.g., downloading additional templates) and/or manage or adjust various parameter settings including, for example, how much of each template is to appear on the screen, what portion of the template is to appear, it's overall illumination level (brightness), its scale, its location, etc. It should be clear to those of ordinary skill in the art that any number of alternative menu choices might be incorporated into such a menu system. Preferably, the entries in the menu will be reviewed and selected through the use of function buttons 115 and/or via numeric keypad 120, depending on the hardware that is available and the desires of the user.

Figure 3:
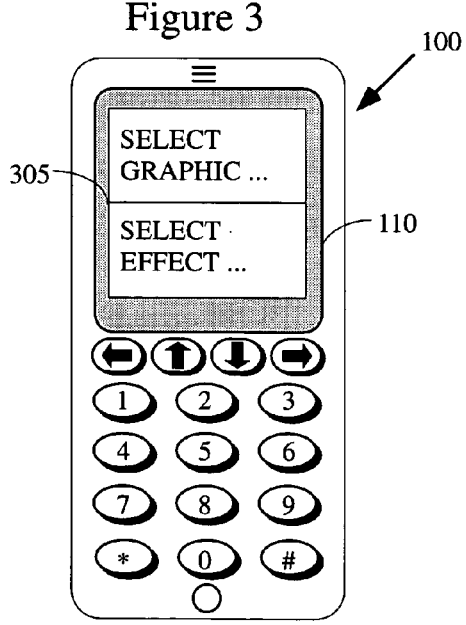
FIG. 3 illustrates a preferred graphical user interface of the instant invention as might be seen after selection of the "Select Template" option.
Figure 4:
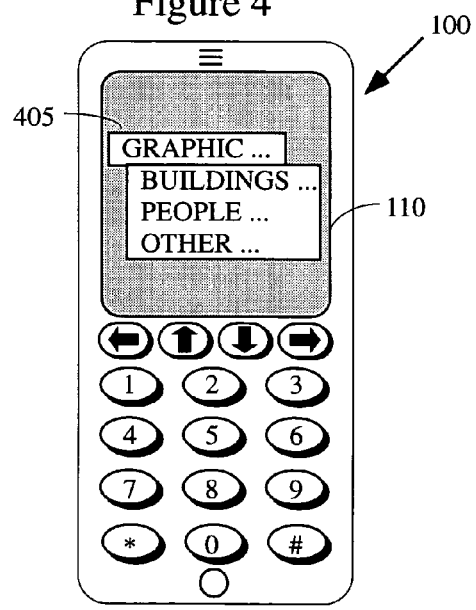
FIG. 4 depicts a preferred graphical user interface of the instant invention after selection of the "Select Graphic" option.

FIGS. 3 and 4 illustrate in more detail some preferred aspects of the picture creating process. FIG. 3 illustrates a screen display 305 that might result from a user choosing the "Select Template" option of FIG. 1. As is illustrated in FIG. 3, preferably the user will then be allowed to select one of the graphic templates previously provided or to specify or select an effect template that is to be applied to the image (menu screen 305). The differences between these types of templates will be discussed in greater detail below.

FIG. 4 illustrates an additional step in the picture creating process that might occur assuming that the user choose the "Select Graphic" option of FIG. 3. In more particular, upon receipt of such a choice from the user the instant invention will preferably display a list of template categories from which the user can choose. These categories could be predefined and incorporated into the software by the software developer or the user could define and sort the templates according to his or her own criteria.

As is further illustrated in FIG. 4 the instant inventors have contemplated that additional pre-defined template categories (e.g., "Other") might also be used (e.g., beach scenes, animals, cartoons, etc.).

Some of the principal differences between graphics templates and effects templates are best illustrated by reference to FIGS. 5 through 9. In brief, a graphic template is a data file that contains graphical or digital picture information. This sort of template could, by way of example only, contain edited pictures of famous people, locations, events, etc. It is anticipated, but not required, that each of the graphic images that is to be used as a template will previously have been edited to create one or more regions within the image that are "blank" or transparent. The intent is that these empty or transparent regions will be aligned by the user with some portion of the actual subject so that the combined picture (template and subject) is pleasant or humorous. In the preferred embodiment, the transparent sections of each template will be defined by the software developer and the user will not have the options of changing those regions except, perhaps, by resizing the template or shifting its screen location.

Figure 5:
FIG. 5 depicts the display screen/preview screen of a typical device suitable for use with the instant invention, wherein only the subject is displayed without any superimposed templates.
Figure 6:
FIG. 6 depicts a preferred display screen after the selection of a graphic template.
Figure 8:
FIG. 8 depicts the preview screen of a preferred embodiment of the instant invention after subject has been aligned with a clear region of the selected graphic template.

Consider the example of FIGS. 5, 6, and 8, which illustrates the use of a graphic template. FIG. 5 contains a representation of photographic subject as he might appear on the preview screen of a cellular telephone and FIG. 6 is a template that the user has chosen to combine with the photographic image. As can be seen, the template of FIG. 6 is a graphic-type cartoon image of George Washington in which the facial area has been made transparent. After a template has been selected, it will be written to the display screen so that the only portions of the original photographic subject that remain visible are those portions which can be viewed through the transparent regions of the template (e.g., the face of the George Washington in this case). The user then manipulates the camera to cause the face of the subject in FIG. 5 to appear within the transparent region of the template overlay as is generally indicated in FIG. 8. Once the user is satisfied with the composite image, he or she can instruct the camera device to take the picture, which will result in the combined image as displayed in FIG. 8 being written to storage.

It should now be clear that in the preferred arrangement after a graphic template is selected, that template will be superimposed over the preview viewing area such that the user views the normal camera preview image through only those regions of the template that have been made transparent by design. It will then be the responsibility of the user to adjust the camera such that the image of the subject and the aperture(s) in the template come into alignment.

An effect template differs primarily from a graphic template in that it contains parameter values which control the application of an effect to selected parts of the digital image. The effect parameters might or might not (depending on the wishes of the programmer) be subject to alteration by the user. The effects could be of many sorts. In some preferred embodiments, effects will be provided that allow the user to adjust the colour, brightness, contrast or any other image-related aspect of the acquired digital image. In other alternatives, the effects would include image manipulation effects such as image warping, image morphing, image reversal, color substitution, edge enhancement, smoothing, posterizing, etc., which might be applied to all or only a portion of the preview screen. The location, intensity, duration, etc., of these effects may be predefined within the template or the user could be permitted to vary them. The operating logic of this aspect of the instant invention will be discussed in greater detail below. Note that the term "preview screen" as used herein should be interpreted in its broadest sense to include any sort of display screen on which a digital image from the photographic device might be displayed in real time while the user is composing the image before the photograph is actually captured.

Figure 7:
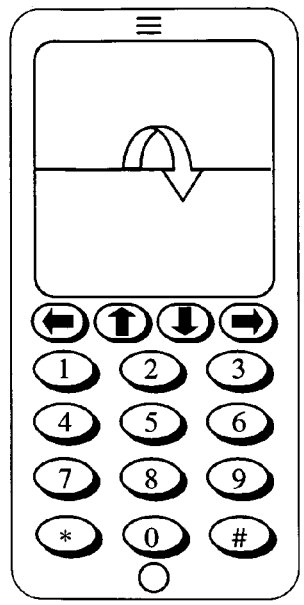
FIG. 7 depicts a preferred display screen after the selection of an effect template.
Figure 11:
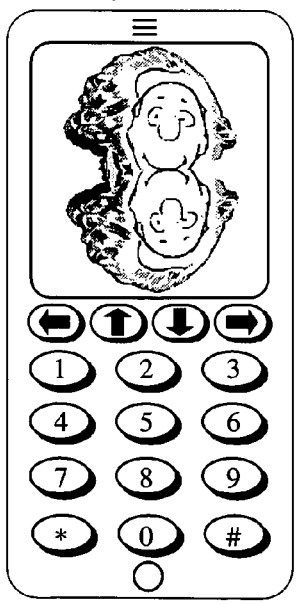
FIG. 11 depicts, as an example, the preview screen of the instant invention in a case where a graphic template has been combined with an effect template to produce a composite image containing the selected subject.

FIGS. 5, 7, and 11 provide an illustration of how a user might combine a graphic template with an effects template. In this example, the user has selected a "mirror image" effect and has further specified a line around which the image is to be mirrored (adjustment of the positioning and angle of the line of reflection might be an option for the user—more preferably, however, would be a hard coded specification of the position and angle of the line). Additionally, the user has combined this effect with the graphic template of FIG. 5. The result of such a selected combination is the preview image of FIG. 11. As can be seen, the subject's image—combined with the graphic template—has been "flipped" around the mirror line, i.e., the image above and below the line are mirror images of each other. Preferably, this effect will be performed in real time so that the user will have an immediate view of what the combined templates will yield when the shutter button is pressed. Note that other preferred arrangements of the instant invention will allow the user to specify sub-regions of the preview screen to which the selected effect might be applied (e.g., the image will be warped or distorted only in the upper left hand corner, etc.). In one preferred embodiment, a graphic representation of the center of an effect (e.g., the center of a twirl or swirl) might appear on the screen and the user would move that icon to the screen location where the effect will be applied.

Figure 9:
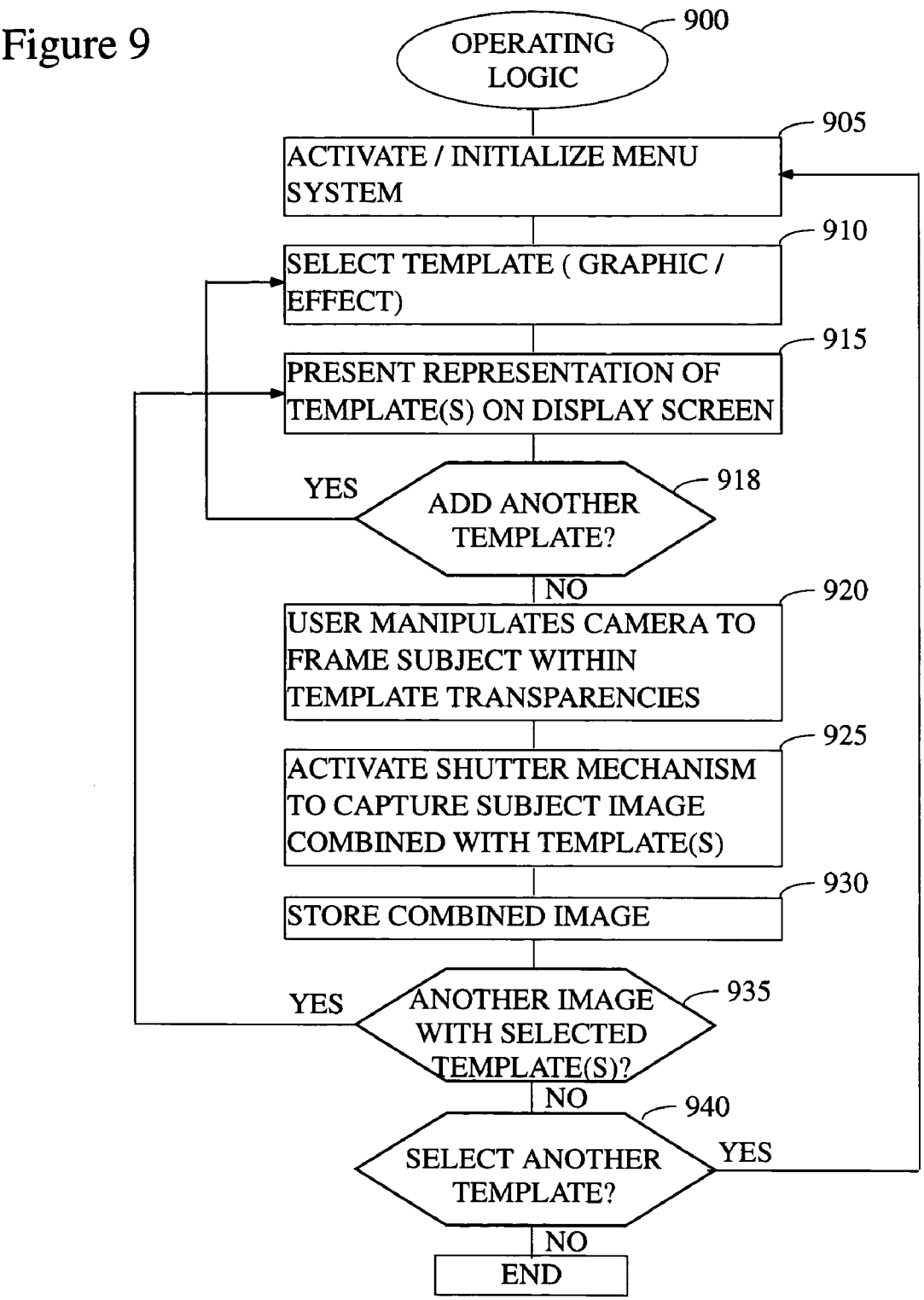
FIG. 9 contains a flowchart that illustrates the steps in the preferred embodiment of the instant invention.

FIG. 9 contains an overview of a preferred operating logic 900 of the instant invention. As a first preferred step 905 the program will be started and initialised according to methods well known to those of ordinary skill in the art. It is preferred that, as part of this process, the user will be presented with a menu system similar to that given by example in FIGS. 1 through 4. Next, the user will preferably select a specific template from among the plurality of available templates, step 910. At least one such template is required, although it would be possible to select more than one template, as the loop between steps 910 and 918 suggests. Next the user will preferably be presented with the selected template on the preview screen of the digital photo device (step 915). This has two positive effects. First, it confirms the user's template choice so that, if the user has selected the wrong template or decides that an intentionally selected template is not suitable, it can be changed before capturing the image. Second, it readies the preview display device so that the combined photograph may be composed and taken.

As a next preferred step 920, after the user is satisfied with the template selection he or she will begin to align the template as displayed in the preview screen with the photographic subject. In this step the user will be able to make any sort of adjustment allowed by the camera including adjusting the aperture, focus, zoom, orientation (e.g., landscape or portrait) and distance to the subject. The user can adjust the image displayed in the preview screen until he or she is satisfied with the result. Once the user is satisfied, he or she can capture the combined image by pressing the shutter button or otherwise signaling to the camera to take the picture (step 925). The camera will then preferably store the combined image (step 930) as is conventionally done. Of course, the image will be stored in the RAM of the camera, in local non-volatile memory (e.g., non-volatile RAM or local hard disk), transmitted via wired or wireless communications to a remote location for storage, etc. If the user so desires, another picture can be taken with the same template choice (steps 935 and 915). Alternatively, the user might elect to change the template and take additional photographs (the "YES" branch of step 940). Clearly, many variations of this approach might be utilized in practice and those of ordinary skill in the art will be readily able to devise them.

Figure 10:
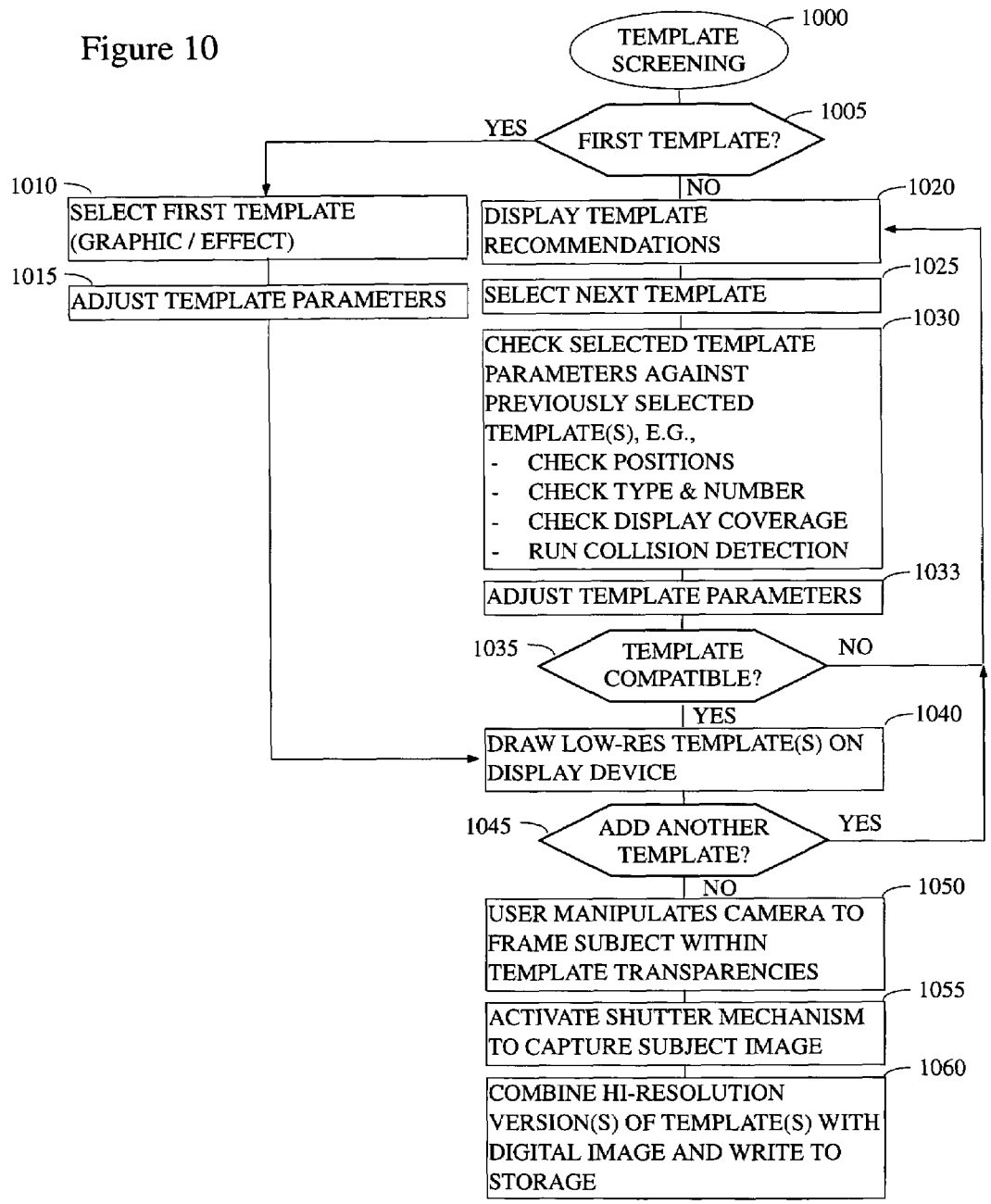
FIG. 10 contains a flowchart which illustrates the logic of the instant invention in comparison to the advanced embodiment of the instant invention

Finally, FIG. 10 contains additional details of the preferred operating logic of FIG. 9. As is indicated in this figure, the template screening and application process 1000 typically would begin with the selection of a first template (the left branch of decision item 1005 and step 1010). Preferably the user will be given the option of adjusting one or more template parameters (step 1015), assuming that the software designer has provided that capability for the chosen template.

As a next preferred step 1040, a low resolution version of the template will be displayed on the preview device. Of course, those of ordinary skill in the art will understand that the resolution of the preview screen of even a low resolution digital camera is much less than the resolution that is ultimately captured and stored as a digital image. As a consequence, it is advantageous (if from the standpoint of computing power requirements alone) to manipulate and display the selected graphic template as a low resolution image. Similarly, in the event that the user has chosen an effect template, calculating and displaying the selected effect at the lower resolution of the preview device would make it possible for even relatively complex effects to be executed and displayed to the user in near real-time (e.g., as the user is composing the photograph). On the other hand, at the time the template and subject image are combined a full resolution graphic template will preferably be utilized so that the resulting composite image will be as sharp as possible. Similarly, any effect template that has been selected by the user will preferably be applied in full resolution to the digital image before it is stored. For purposes of the instant disclosure, when a "high resolution" template is referred to herein, it should be understood to be a high resolution graphic image (in the case of a graphic template) or a full resolution application of a chosen effect to the recently captured digital image (in the case of an effects template). Similarly, when the term "low resolution" is used that will mean a graphic image or effect that operates at a resolution that is less than that of the digital camera, e.g., at the resolution of the preview device. Note that it is preferred that a low and a high resolution version of each graphic template be stored in the photographic device, although it is certainly possible that the low resolution version could be calculated as-needed from the high resolution version.

As a next preferred step 1045, the user will be allowed to add another template to the photograph if so desired. If the user decides not to add another template, the device will be prepared to photograph a subject (steps 1050 and 1055), after which the combined image will preferably be combined with a high resolution version of the selected graphic template(s) and the selected effect(s) will be applied to the resulting high resolution digital image before storing the final product to non-volatile storage (step 1060).

In the event that the user wishes to select an additional template to combine with the one or more templates already chosen (the "YES" branch of decision node 1045), the program then preferably provides the user with a choice of recommended additional templates (step 1020). In the preferred embodiment, at least some of the recommended companion templates will have been selected in advance by the author of the software program. As an example, and referring once again to FIGS. 4 through 8, given that the user has selected a "George Washington" graphic template, additional graphic templates might be suggested to the user which would be specifically suited to accompany this choice. Examples of such companion templates could include backgrounds that show a cherry tree, a picture of the Washington Monument, etc., each of which would have been specifically designed so as to occupy the space outside of the portrait graphic and designed so as to not obscure the transparent regions of the first-selected template. Preferably, the user will be allowed to determine template priority (i.e., which template is "on top", which is next "below", etc.) at this same time.

As a next preferred step, the user will choose another template which might be one of the recommended templates or not (step 1025). In either case, but especially in the case of a non-recommended template, the instant invention will preferably next compare the parameters of the selected templates to see if they are compatible (step 1030). As an example of the sorts of parameters that might be examined, the program might compare the transparent regions of the two or more templates to make certain that they coincide to the extent that at least some of the subject is visible through the combination. As another example, certain types of templates might be determined to be incompatible (e.g., two templates which the designer knows have no transparent regions in common) or redundant (e.g., if the same effect is inadvertently selected twice), in which case the user would preferably be notified of this fact and the second of the two templates would preferably not be added to the combination. As still another example, the software might check to determine the total percentage of the digital image that will be covered by the combined templates. In some cases, a software designer might determine that, practically speaking, coverage percentages in excess of a predetermined value are per se undesirable and generate errors when graphical template combinations are selected that block out more the predetermined amount of the subject image. Of course, this determination could either be made on the fly as the templates are selected or determined in advance and stored within the program in the form of an incompatible template list. Finally, a collision detection algorithm might be executed. The collision detection is used to make certain that the selected templates do not obscure one another in a way hat renders the picture taking process useless. The collision detection primarily utilizes the positional data that is incorporated in both the graphic and effect templates and compares these data against the dimensions of the display screen. If a defined blank area in one template is obscured by another template the collision detection intervenes and does not permit the user to insert the selected second template. Additional to that the collision detection intervenes if too much of a specific template is obscured by another template. The definition of the value that specifies the threshold for the intervention can be defined by default or by the user.

Next, and in those instances where the programmer has made provision for such, the inventor will be given the opportunity to adjust the template parameters (step 1033), after which it might be desirable to repeat step 1030 to guard against the event that the user's parameter changes have created a problem in the composite template. If it is determined that the selected template and its parameter values result in a valid selection (the "yes" branch of step 1035), a low resolution version of the composite template combination will preferably be drawn on user's preview screen (step 1040), after which the user would be expected to adjust the aim of the camera until the subject fits within the transparent regions provided (step 1050).

Finally, triggering the shutter mechanism (step 1055) will preferably be followed by application of the high resolution template(s) to the image captured by the digital camera (step 1060). The process of combining the template data and the subject picture data is preferably carried out using methods of picture combination that are well known to those of ordinary skill in the art. For example, a "blue box" technique might be utilized, wherein the data are combined by using alpha channels/alpha blending, etc. As has been discussed previously, the use of the high resolution template versions is recommended to make certain that resulting combined image is as aesthetically pleasing as possible.

CONCLUSIONS

Of course, many modifications and extensions could be made to the instant invention by those of ordinary skill in the art. For example in one preferred embodiment the instant invention will be used to create picture postcards that can be distributed to friends and family according to methods well known to those of ordinary skill in the art.

Although much of the previous discussion has concerned the use of templates that completely obscure or replace part of the subject image, it is certainly possible that a template might have some degree of translucency (e.g., in the extreme case a blue-tinted semi-transparent graphic template that creates an "under water" effect and extends over the entire digital image). As a consequence, when a graphic template is referred to herein the graphic should be understood to include those cases where the template is largely (or entirely) translucent. What is important, though, is that part or all of the original photographic subject must be visible therethrough.

Additionally, it is anticipated that in some situations there might be multiple transparent areas within a template that would be designed to accommodate multiple subjects, e.g., a collection of multiple empty face portals into which several individuals' heads could be positioned in a group photo. Further, it should be noted that the term "subject" as used herein should be construed broadly to include both animate and inanimate objects. For example, a template might be provided which contains an image of snow along its base which template might introduce a humorous element into a photograph of the pyramids of Egypt. These and other variations are well within the ability of those of ordinary skill in the art to devise.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A real-time method of creating a composite digital image within a digital photo device, said digital photo device having a display device integral thereto, said display device at least for displaying previews of digital images, wherein is provided a plurality of user-selectable templates and wherein is provided at least one template compatibility rule, comprising the steps of:
   a. within said digital photo device, choosing two or more templates from among said plurality of templates;
   b. selecting one or more of said template compatibility rules;
   c. using said selected template compatibility rules to determine whether said chosen two or more templates are compatible;
   d. only if said selected templates are determined to be incompatible, requiring another selection according to step (b), else, determining that two or more compatible templates have been selected;
   e. selecting a subject of said composite digital image;
   f. simultaneously displaying in real-time a representation of said selected two or more compatible templates together with a representation of said subject on said preview display device while a user orients said photo device to include an image of the subject within the template as it appears in said preview display device;
   g. activating said photo device to capture a composite digital image of said subject and said template, thereby creating said composite digital image; and,
   h. storing said composite image on computer readable medium, thereby creating a composite photograph.

2. A method according to claim 1 wherein one of said provided template compatibility rules contains a pre-defined listing of which of said plurality of templates is incompatible.

3. A method according to claim 1, wherein at least one of said user-selectable templates is a graphic template, and one of said provided template compatibility rules specifies a maximum permitted proportion of said composite image occupied by one or more of said graphic templates.

4. A real-time method of creating a composite digital image within a digital photo device, said digital photo device having a display device integral thereto, said display device at least for displaying a preview of digital photos to be taken by said digital photo device, wherein is provided a plurality of user-selectable templates, wherein is provided at least one template compatibility rule, comprising the steps of:
   a. within said digital photo device, choosing two or more templates from among said plurality of templates;
   b. selecting one or more of said template compatibility rules;
   c. using said one or more selected template compatibility rules to determine whether said chosen two or more templates are compatible;
   d. if said selected templates are determined to be incompatible, requiring another selection according to steps (a) through (c), else, determining that said chosen two or more templates have been selected, thereby obtaining two or more compatible templates;
   e. combining said two or more compatible templates into a multi-layer template;
   f. selecting a subject of said composite digital image;
   g. simultaneously displaying in real-time a representation of said multi-layer template together with a representation of said subject on said preview display device while a user orients said photo device to include an image of the subject within the multi-layer template as it appears in said preview display device,
   h. activating said photo device to capture a composite digital image of said subject and said multi-layer template; and,
   i. storing said composite image on a computer readable medium, thereby creating said composite digital image.

5. A method according to claim 4, wherein one of said provided template compatibility rules contains a pre-defined listing of which of said plurality of templates are incompatible.

6. A method according to claim 4, wherein at least one of said user-selectable templates is a graphic template, and one of said provided template compatibility rules specifies a maximum permitted proportion of said composite image occupied by one or more of said graphic templates.

7. A method according to claim 4, wherein said selected two or more compatible templates comprise a multi-layer template.

8. A method according to claim 4, wherein said multi-layer template is a graphic template, wherein said created multi-layer template has a resolution commensurate with a resolution of said digital photo device, and wherein said representation of said created multi-layer template comprises a low-resolution version of said selected at least two or more templates.

9. A method according to claim 4, further comprising the steps of:
   j. reading said composite image from said medium; and,
   k. displaying a representation of said composite image on a computer display.

10. A method according to claim 4, further comprising the step of:
    j. reading said composite image from said medium; and,
    k. printing a representation of said composite image on a generally flat medium.

11. A method according to claim 4, wherein at least a portion of said two or more templates are effect templates.

12. A method according to claim 11, wherein said effect templates are selected from a group consisting of an image warping template, an image morphing template, an image reversal template, a color substitution template, an edge enhancement template, an image smoothing template, and a posterizing template.

13. A method according to claim 4, wherein at least a portion of said two or more templates are graphic templates, each of said graphic templates containing at least one transparent region therein, said at least one transparent region being for viewing at least a portion of the subject therethrough.

14. A method according to claim 4, wherein step (a) comprises the steps of:
    (a1) within said digital photo device, choosing two or more templates from among said plurality of templates, and, (a2) determining a template priority of said selected two or more templates.

15. A method according to claim 4, wherein at least one of said compatibility rules utilizes a collision detection algorithm, said collision detection algorithm at least for comparing blank regions of two graphic templates to determine an amount of blank region common to both, and comparing said amount of blank region common to both to a predetermined threshold level.

16. A method according to claim 4, wherein said digital photo device is selected from a group consisting of a digital camera and a cellular phone.

17. A real-time method of creating a composite digital image within a digital photo device, said digital photo device having a display device integral thereto, said display device at least for displaying previews of digital images taken by said digital photo device, comprising the steps of:

a. storing a plurality of user-selectable templates within said digital photo device;

b. storing at least one template compatibility rule within said digital photo device;

c. within said digital photo device, choosing two or more templates from among said plurality of templates;

d. using at least one of said at least one template compatibility rules to determine whether said chosen two or more templates are compatible or incompatible;

e. if said selected templates are determined to be incompatible, requiring a further selection among said plurality of templates until at least two templates are chosen that are compatible according to said at least one of said at least one template compatibility rules;

f. selecting a subject for photographing with said digital photo device;

g. simultaneously displaying in real-time on said display device a representation of each of said plurality of compatible templates together with a representation of the subject while a user orients said photo device to include an image of the subject within the simultaneously displayed compatible templates;

h. activating said photo device to capture a digital image of said subject together with said plurality of compatible templates, thereby obtaining a composite digital image; and, i. storing said composite image in a compute readable medium, thereby creating a composite photograph.

* * * * *